United States Patent [19]
Sagarian

[11] 4,359,299
[45] Nov. 16, 1982

[54] MILLING CUTTER

[75] Inventor: John Sagarian, Auburn, Mass.

[73] Assignee: Ilco Unican Corp., Rocky Mount, N.C.

[21] Appl. No.: 186,281

[22] Filed: Sep. 11, 1980

[51] Int. Cl.³ .............................................. B26D 1/00
[52] U.S. Cl. ........................................ 407/55; 407/57; 407/62
[58] Field of Search ..................... 407/62, 64, 57, 48, 407/53, 59, 63, 55, 33, 42, 61; 29/76 C, 78 R

[56] References Cited

U.S. PATENT DOCUMENTS

| 1,044,333 | 11/1912 | Adams | 407/53 |
| 1,898,732 | 2/1933 | Krohne | 407/55 |
| 2,406,780 | 9/1946 | Kutscha | 407/42 |
| 2,930,111 | 3/1960 | St. Clair | 407/10 |
| 3,576,061 | 4/1971 | Pahlitsch | 407/60 |
| 3,615,813 | 1/1965 | Harvell et al. | 407/53 |
| 3,678,554 | 7/1972 | Ezhov et al. | 407/62 |
| 4,132,493 | 1/1979 | Hosoi | 407/42 |

Primary Examiner—Leonidas Vlachos

[57] ABSTRACT

A circular cutter having side milling teeth formed on curves that continuously change from a zero or positive rake to a greater and greater negative rake, the curves being generally convex.

2 Claims, 3 Drawing Figures

MILLING CUTTER

BACKGROUND OF THE INVENTION

Most milling cutters, e.g., side and end mills, have straight or spiral cutting teeth, but applicant is not aware of any form or milling cutter that has teeth with a constantly changing rake, i.e., from zero to positive rake, or from a positive to a negative rake. Applicant has devised such a tooth especially for side milling and as a particular instance, cutters for key cutting. These novel cutters are found to cut faster and cleaner than the usual cutters having straight line cutting teeth at the sides of the cutters.

SUMMARY OF THE INVENTION

This invention relates to any side milling cutter. The applicant is well aware of millers that have spiral face teeth and also spiral fluted reamers, end mills, etc. This invention provides a side cutter with teeth with cutting areas that gradually advance, from the cutter periphery inwardly, from a line tangent to a cylinder having the cutter axis as a center at one side of the cylinder, to a line tangent to the cylinder at the other side of the axis. Each cutting edge is on a curve that gradually and constantly changes from a zero or slightly negative rake to a greater and greater positive rake, and this gives a cutter that side mills with less chatter and a better finished cut.

The degree of the change in the rake may be very slight and may be unappreciable to the naked eye but it shows up under even minor magnification.

PREFERRED EMBODIMENT OF THE INVENTION

Figure 1:
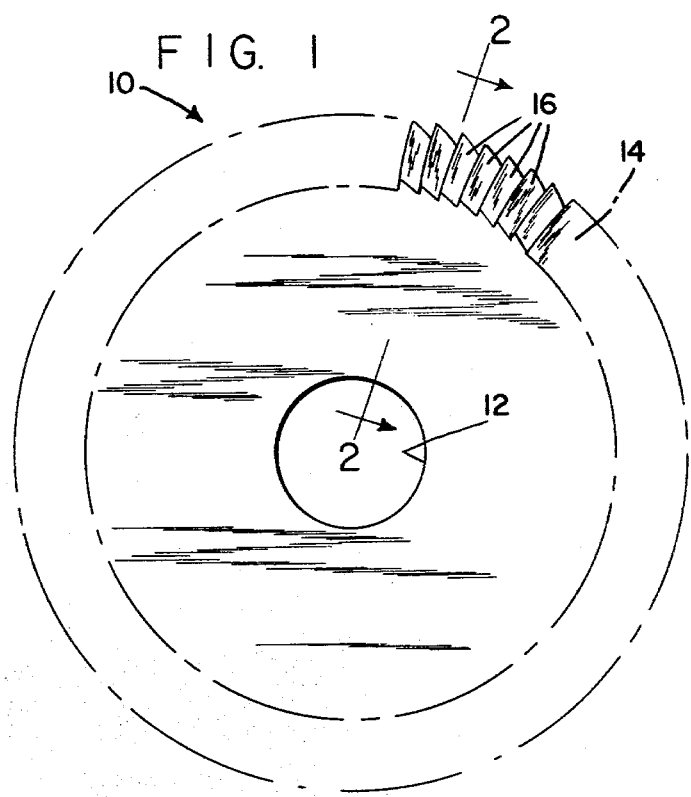
FIG. 1 is a plan view of a milling cutter according to the present invention.
Figure 2:
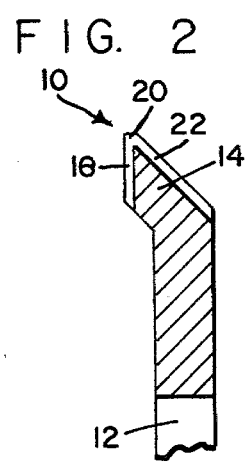
FIG. 2 is a section on line 2—2 of FIG. 1.
Figure 3:
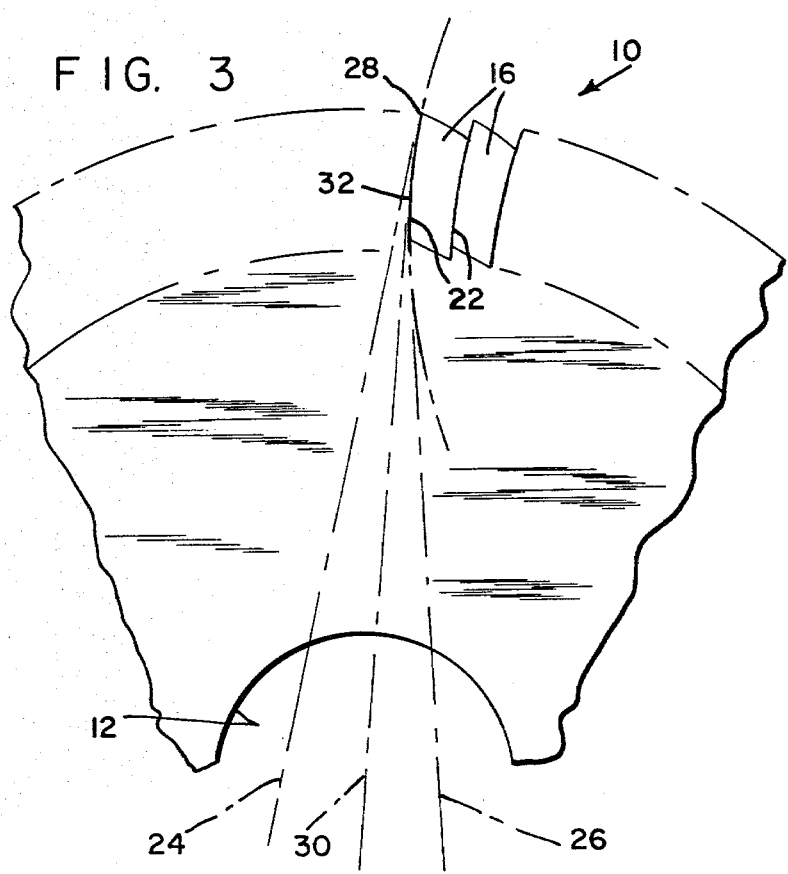
FIG. 3 is a fragmentary plan view on an enlarged scale showing the invention.

This invention is disclosed as applied to a key cutter which is a circular cutter 10 having in this case an arbor hole 12 and a peripheral area at 14. This periphery bears the cutting teeth which in this case are represented by teeth 16, which have straight side cutting teeth 18, peripheral cutting teeth 20, and angled side cutting teeth 22. The side cutting teeth 18 have cutting edges that lie in a plane normal to the cutter axis. The angled side cutting teeth 22 have cutting edges all portions of which lie on the surface of a cove which is concentric to the cutter axis, but which edges are formed on an arc such as shown in FIG. 3. This arc is also visible in FIG. 1, but is not readily apparent. Most conventional miller cutter teeth have straight cutting edges and faces, and may have a positive or forward rake, in which case the cutting edges would be about on line with broken line 26, FIG. 3; or they might have a negative or rearward rake, as on line 24.

In this invention, the cutting edges of the angled side cutting teeth 22 are not straight but they are made on a curve that is convex. The extreme point of each tooth at 28 trends into a first cutting edge portion that is either zero or slightly negative rake. That is, it is tangent to a line 24 passing to the left of the cutter axis 30 as seen in FIG. 3, if it has negative rake, or through this axis if it has zero rake. As the curved edge and face 32 of the tooth is followed down, or inwardly this tangent moves to the right. As shown, the tangent line terminates at line 26, but the entire tooth edge has progressed gradually from a slightly negative, or zero rake, to a pronounced positive rake.

These teeth may be formed on the machine disclosed in copending application, Ser. No. 152,614 filed May 23, 1980. The degree of change in the rake can be modified by varying the position of the carbide cutter that cuts the teeth on the blank.

I claim:

1. A rotary cutting tool for cutting V-shaped notches in key blanks, characterized by:
    A. circumferentially spaced peripheral teeth on the tool adapted to form the bottoms of notches in a key blank;
    B. circumferentially spaced side cutting teeth on opposite sides of the tool at the peripheral portion thereof;
    C. the cutting edges of the cutting teeth at the opposite sides of the tool being in outwardly convergent relation to one another, toward and to said peripheral teeth so as to be cooperable therewith in the cutting of substantially V-shaped notches in a key blank;
    D. and the cutting edges of the teeth at one side of the tool having substantially slight convex curvature that changes gradually but continuously from a substantially zero rare at the outer extremities of said teeth to a positive rake at the inner extremities of said teeth, said convex cutting edges lying on the surface of a cone which is concentric with the axis of rotation of the tool.

2. The rotary cutting tool of claim 1 further characterized by:
    A. the teeth at the other side of the tool being straight and having cutting edges which lie in a plane normal to the axis of rotation of the tool;
    B. and said last named teeth being substantially shorter in their radial dimensions than said teeth with the convex cutting edges.

* * * * *